Sept. 13, 1949.  R. S. HOPKINS  2,481,668
FILM-HANDLING APPARATUS AND FILM READER PROJECTOR
Filed July 2, 1946  2 Sheets-Sheet 1
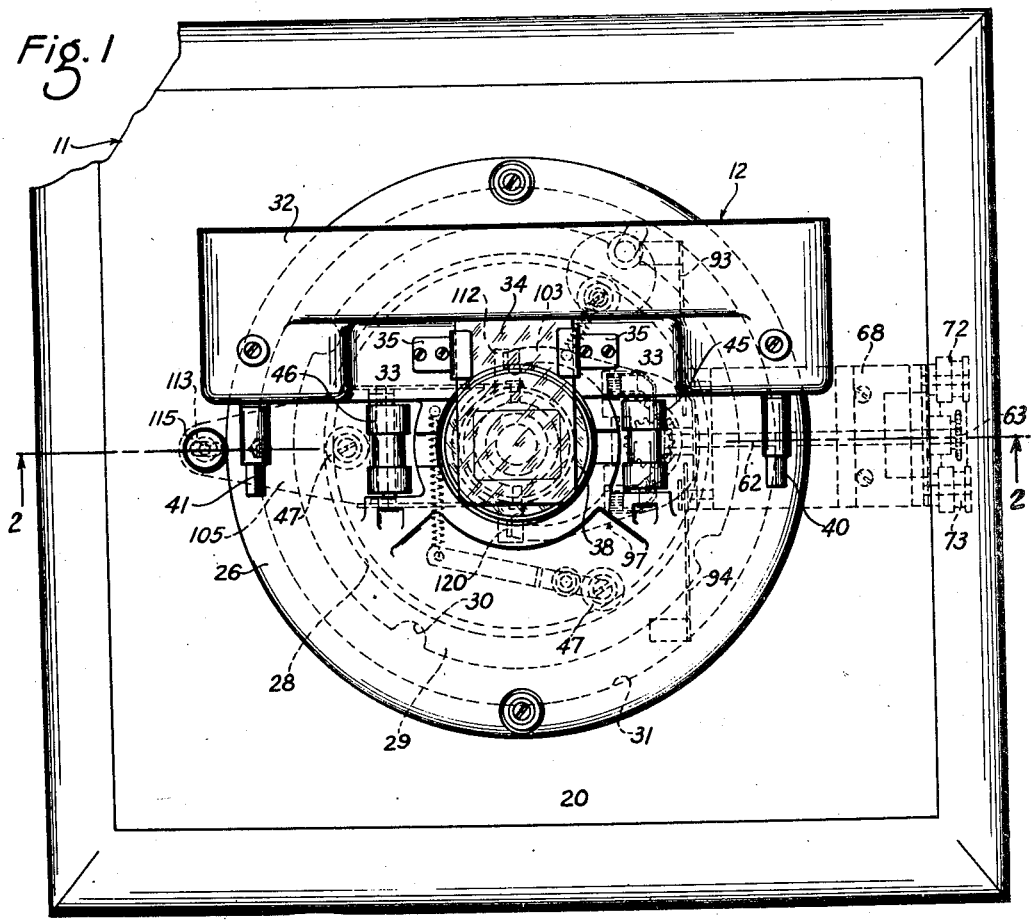
Roy S. Hopkins
INVENTOR
BY
ATTORNEYS Sept. 13, 1949.  R. S. HOPKINS  2,481,668
FILM-HANDLING APPARATUS AND FILM READER PROJECTOR
Filed July 2, 1946  2 Sheets-Sheet 2
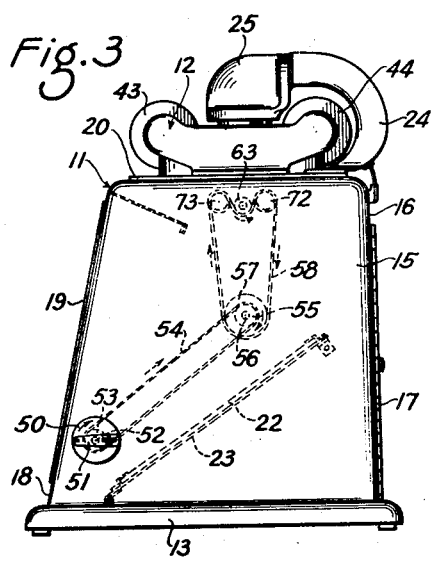
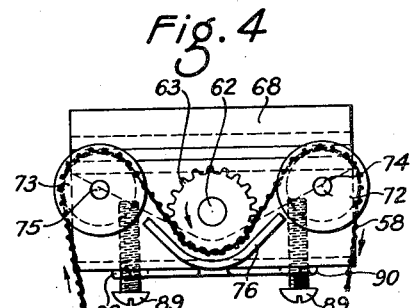
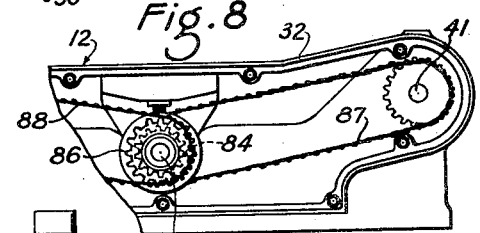
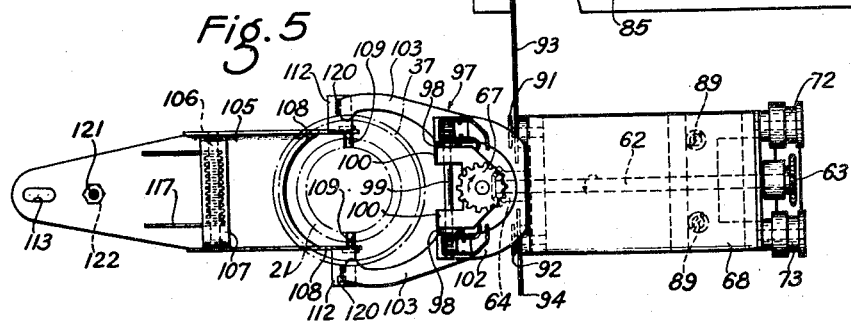
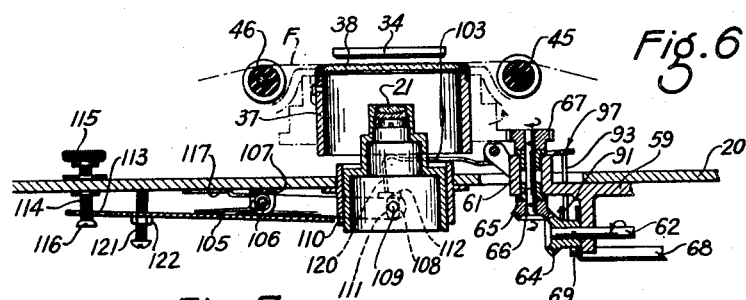
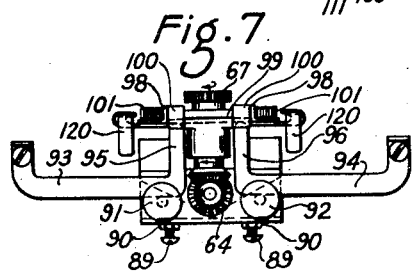
Roy S. Hopkins
INVENTOR
BY
ATTORNEYS Patented Sept. 13, 1949

2,481,668

UNITED STATES PATENT OFFICE 2,481,668

FILM-HANDLING APPARATUS AND FILM READER PROJECTOR

Roy S. Hopkins, Rochester, N. Y., assignor to Eastman Kodak Company, Rochester, N. Y., a corporation of New Jersey Application July 2, 1946, Serial No. 680,990

11 Claims. (Cl. 88—24)

The present invention relates to a film-handling apparatus and more particularly to an arrangement for maintaining the projected image of a film strip in focus at all times on the screen of a film reader such as shown in my U. S. Patent 2,279,463, granted April 14, 1942.

As is well known, the film strip in a film reader is usually clamped between two glass flats for projecting its image onto the screen. Before the film strip is moved to bring the next frame into its projecting position, the glass flats are automatically separated by the actuation of the winding means, and the film is then free to be wound from the supply to the take-up reel. During the movement of the film strip, the moving image appearing on the screen is blurred and out of focus due to the film strip being displaced from the focal plane of the objective by the separation of the glass flats. It is desirable, therefore, to provide a means whereby the projected image is always in focus, regardless of the position of the film strip.

The primary object of the invention, therefore, is to provide a film-handling apparatus in which the objective member is displaced in accordance with the displacement of the film strip so that the projected image of the film strip is always in focus on the viewing screen.

Another object of the invention is to provide a film-handling apparatus in which the objective member is displaced by the movable gate-operating member in accordance with the displacement of the film strip so that the projected image of the film strip is always in focus on th viewing screen.

Still another object of the invention is to provide a film-handling apparatus in which the objective member assumes one position when the film strip is stationary and a second position when the film strip is being wound from the supply to the take-up reel for providing an image of the film strip which will always be in focus.

And yet another object of the invention is to provide a film-handling apparatus in which the objective member assumes two positions in accordance with the position of the film strip and has means provided for focusing of the objective member in either of said positions.

These and other objects and advantages will be apparent to those skilled in the art from the following description.

The above objects of the invention are embodied in a film-handling apparatus, such as a film reader, comprising a casing including a wall, a mirror mounted in the casing, a screen on the front wall of the casing, a rotatable head on the wall for supporting a film strip and including spindles and driving means for said spindles. The objective member is slidably mounted in the wall for movement along its optical axis and for projecting an image of the film strip onto the screen; the film strip being held between a stationary and a movable gate member on the head with an operating means connected thereto and actuated by the driving means for opening the movable gate member and displacing the objective for maintaining the image of the film strip on said screen in focus.

Reference is now made to the accompanying drawings wherein similar reference characters designate similar parts and wherein:

Fig. 1 is a plan view of the top only of a film-handling apparatus embodying the present invention;

Fig. 2 is a fragmentary vertical section through the top of the film-handling apparatus taken on the line 2—2 of Fig. 1 and showing the film in its clamped position;

Fig. 3 is a side elevation of the film-handling apparatus;

Fig. 4 is an end view of the rockable cradle showing the endless drive member connected to its supporting shaft;

Fig. 5 is a plan view of the rockable cradle of the gate-opening means and the supporting means for the objective member;

Fig. 6 is a partial section similar to Fig. 2 showing the movable gate member in its open position and the objective member in its displaced position with the film free for winding from the supply to the take-up reel;

Fig. 7 is an end view of the cradle showing the connections to the movable gate member; and Fig. 8 is a fragmentary rear view of the film-supporting head with the cover plate removed and showing the connections to the spindles on the head.

Although the present disclosure relates to a film reader or projector, it shall be understood that this invention may also be applied to any type of film-handling apparatus. In the illustrated embodiment of the invention, the film-handling apparatus comprises a casing 11 and a rotatable film-supporting head 12; the casing 11 comprising a base 13, side walls 14 and 15, a rear wall 16 part of which is swingably mounted on the hinge 17 (see Fig. 3), and a front wall 18 which is provided with an opening for a translucent screen 19. A top wall or plate 20 is riveted, or secured in some similar manner, to the casing 11 and has mounted thereon an objective member 21.

A mirror 22 is mounted on a plate 23 which is hinged to the base 13 and functions to reflect the image received from the objective member 21 onto the screen 19. A light-baffling frame may be mounted inside the casing 11 adjacent the front wall 18 so that when the plate 23 is swung against the frame, the interior of the casing is shielded against any light entering through the screen 19. With this arrangement, the projecting apparatus may be used as a projection enlarger, as is more fully disclosed in my above-mentioned patent.

A curved bracket 24 is fastened to the wall 20 and supports a lamphouse 25 (see Fig. 3), which contains the usual light source and condensers, not shown, for directing a beam of light downwardly into the objective member 21.

The film-supporting head 12 comprises a circular cap-like frame 26 provided with an internal cavity 27 and an internal annular V-shaped groove 28. The frame 26 has a circular flange 29 which is provided with notches 30 located in quadrature and with an annular recess 31 adjacent said circular flange 29.

A winding means housing 32 is mounted on frame 26 and includes a ledge 33 on which a stationary gate member or glass flat 34 is mounted by a pair of clips 35. A cylindrical sleeve 36 is fastened within the cavity 27 of frame 26 and forms a guideway for the movable gate member which is composed of a cylindrical barrel 37 axially slidable within sleeve 36 and carrying a glass flat 38 fastened to one end of barrel 37 by the threaded ring 39.

The spindles 40 and 41 are rotatably mounted in respective ends of the housing 32, being preferably journalled within bearings formed integrally with the housing 32. Film holders or reels 43 and 44 may be positioned respectively on the spindles 40 and 41, and the intervening film strip F passes between the glass flats 34 and 38 forming the stationary and movable gate members. A guide roller 45 is rotatably mounted in frame 26 between spindle 40 and the film gate, and a second guide roller 46 is rotatably mounted in frame 26 between the film gate and the spindle 41. The guide rollers 45 and 46 may be centrally recessed for guiding a narrow width of film, such as 16-mm. film, through the film gate.

Since the objective member 21 is mounted on the wall 20 and since the film gate on glass flats 34 and 38 are mounted on the head 12, it is extremely important that the mounting means for rotatably supporting the head 12 shall accurately support the head 12 so that the stationary glass flat 34 or guiding surface thereof will place the supported film strip F in the focal plane of the objective member 21. To this end the film head 12 is provided with the internal annular groove 28 which has a contour complementary in shape to the peripheries of a plurality of rollers 47 mounted on the wall 20. It will be noted that the rollers 47 and groove 28 are arranged, respectively, on wall 20 and in cap-like frame 26 so that the head 12 is rotatable concentrically of objective member 21 or so that the axis of rotation of head 12 coincides with the optical axis of the objective member 21. A more detailed description of the arrangement for mounting the head 12 may be had by reference to the above-mentioned patent.

The film winding means comprises one or more driving elements on the rotatable head 12. The winding means in the casing 11 comprises a winding member 50 carrying a handle 51, shown in the folded position in Fig. 3, and is mounted externally of casing 11 on one end of shaft 52 which is journalled in the side wall 15. A sprocket 53 is mounted on the inner end of shaft 52 within casing 11 and engages a chain 54 encircling a sprocket 55 on a shaft 56 also journalled in the wall 15. A larger sprocket 57 is also mounted on shaft 56 and is encircled by an endless drive member or chain 58.

A bracket 59 is fastened to the underside of the wall 20 and includes bearing lugs 60 and a sleeve 61. A shaft 62 is rotatably supported in bearing lugs 60 and carries on one end a sprocket 63 and on the other end a mitre gear 64. A stub shaft 65 is journalled in the sleeve 61 of bracket 59 and carries on its lower end a mitre gear 66 in mesh with the gear 64 and on its upper end a pinion gear 67.

The gate-opening means comprises a cradle 68 having an end plate 69 and an end plate 70. The end plate 69 is provided with an aperture for rotatably encircling the hub of the mitre gear 64, while the end plate 70 encircles a bushing 71 which is freely rotatable on the shaft 62. A pair of idler supports are mounted on the end of cradle 68 on opposite sides of the shaft 62 and maintain the endless drive member 58 in engagement with sprocket 63 without permitting appreciable slack in the endless drive member or chain 58. Such idler supports comprise grooved rollers 72 and 73, roller 72 being freely rotatable on a pin 74 extending from end plate 70 of cradle 68 and roller 73 being freely rotatable on a pin 75 extending from end plate 70 but on the opposite side of shaft 62 from the pin 74. A guard plate 76 (see Fig. 4) is mounted on cradle 68 and has an arcuate portion adjacent the periphery of sprocket 63 to hold the chain 58 thereon. Thus it will be seen that upon rotation of the winding member 50 by crank handle 51 the shaft 52, chain 54, and sprocket 55 will be rotated. In turn, large sprocket 57, chain 58, sprocket 63, shaft 62, mitre gear 64, mitre gear 66, shaft 65, and gear 67 will also be rotated. These elements constitute the elements of the winding means on the casing 11 of the apparatus.

The winding means elements on the film-supporting head comprise a rotatable ring member, a clutch member, and driving connections from the clutch members to the spindles 40 and 41. The ring member 80 (see Fig. 2) is rotatably mounted on the cylindrical sleeve 36 of the frame 26 by means of the ball bearing mounting 81. The ring member 80 is provided with a toothed periphery 82 for meshing with the pinion 67 and with a crown gear portion 83 for meshing with the pinion 84 forming a part of the clutch assembly.

As disclosed in my above-mentioned patent, a clutch assembly designated broadly by the numeral 85, is provided between the pinion 84 and two sprockets 86 (see Fig. 8) for selectively driving either spindle 40 or 41, depending on the direction of rotation of the winding member 50. The endless chains 87 and 88 connect the sprockets 86 with the sprockets on the spindles 40 and 41.

The operation of the complete winding means including the elements on the casing and on the head will now be described. When the winding member 50 is rotated by the handle 51 in a clockwise direction, as indicated by the arrow in Fig. 3, the sprocket 53, the chain 54, and the sprockets 55 and 56 are also rotated in a clockwise direction. At the same time, the endless drive member 58 is moved in the direction indicated by the arrows in Fig. 3, so that sprocket 63, shaft 62, and mitre gear 64 are rotated in a counter-clockwise direction, as indicated in Figs. 3 and 4. Thus the mitre gear 66, shaft 65, and pinion 67 are rotated in a clockwise direction, as viewed from Fig. 5, and by virtue of the meshing of pinion 67 with the toothed periphery 82 of the ring member 80, the ring member 80 is rotated in a counter-clockwise direction as viewed from the top of the apparatus. The movement of the ring member 80 is transmitted through the crown gear 83 and the pinion 84 to the clutch assembly 85 so that the chain 88 drives the sprocket connected to the spindle 41, thereby permitting the spindle 40 to turn freely. As a result, upon such clockwise movement of the winding member 50, the film F will be moved to the left in Fig. 2 and will be wound upon the film reel 44 on spindle 41. Conversely, when the winding member 50 is rotated in the opposite direction, all of the winding elements are moved in the opposite direction, and the clutch assembly 85 then changes the drive to the spindle 40 and permits the reel 41 to turn freely. The film will then be moved to the right in Fig. 2 and will be wound upon the film reel 43 on the spindle 40.

The rockable cradle 68 of the operating or gate-opening means carries a pair of abutments for limiting the angular movement of said cradle. Such abutments may be conveniently provided as screws 89 threaded into the cradle 68 and locked in their adjusted position by lock nuts 90. The upper ends of the screws 89 are adjusted to strike the bracket 59 when the cradle has been rocked to its limit in either direction. Such rocking of the cradle 68 is utilized to open or separate the glass flats 34 and 38 and to displace the objective member 21 in a manner about to be disclosed.

For this purpose intermediate means may be provided between the cradle 68 and the movable gate member 38. Slotted discs 91 and 92 are fastened to the end plate 69 of cradle 68. Levers 93 and 94 are pivotally mounted from lugs on top wall 20, have upright arms 95 and 96, and lie, respectively, in the slots of discs 91 and 92. A fork member 97 has ears 98 and is pivotally mounted over top wall 20 by means of a spindle 99 which passes through said ears 98 and lugs 100 extending from the sleeve 61 of bracket 59. Coil springs 101 encircle each end of the spindle 99, each having one end engaged under the lugs 100 and each having one end bearing upon the circular portion 102 of fork member 97 (see Figs. 5 and 7). The other side of fork member 97 includes arms 103 which extend around each side of the objective member 21 and which engage the lower edge of the barrel 37. The action of coil springs 101 normally moves said fork member 97 so that the arms 103 raise the barrel 37 and resiliently press the glass flat 38 against the glass flat 34 or against the film strip F therebetween.

The supporting means for the objective member 21 comprises a lever 105 which is pivotally mounted by means of the spindle 106 to the bracket 107 which is secured to the top wall 20. The lever 105 is provided on one end with two extending ears 108 which carry pins 109 for engaging the objective member 21. The sleeve 110 which is secured to the top wall 20 and in which the objective member 21 is slidably mounted is provided with slots 111 to permit the pins 109 to be inserted in the objective member 21. The ears 108 are also provided with extensions 112, the purpose of which will be described hereinafter. The other end of the lever 105 is provided with an elongated slot 113 through which the threaded stem 114 of the focusing knob 115 extends. The stem 114 has fixed thereto a cap 116 which maintains the lever 105 in the position shown in Fig. 2. A coil spring 117 surrounds the spindle 106 and serves to hold the lever 105 in the position shown in Fig. 2 in which the objective member 21 is in the position for forming an image of the stationary film strip F upon the screen 19.

The actuating means on the gate opening means comprises vertical extending portions 120 on the ears 98 of the fork member 97 which engage the extensions 112 on the ears 108 of the lever 105.

When the winding means elements on the casing are operated, the endless drive member or chain passing over the grooved rollers 72 and 73 on the cradle 68 causes said cradle 68 to rock in a direction corresponding to the direction of movement of the winding means elements. For instance, rotation of the winding member 50 causes movement of the chain 58 in the direction of the arrow in Fig. 3, and tension in the right-hand strand of chain 58 will act downwardly on the ground roller 72 to cause said cradle 68 to rock in a clockwise direction with respect to Figs. 3 and 4. Such rocking of the cradle 68 raises the slotted disc 92 and moves the lever 94 so that the upright arm 96 thereof engages the circular portion 102 of the fork member 97 to raise the same against the action of the coil spring 101. This raising of the circular portion 102 of the fork member 97 lowers the fork arms 103 and permits the cylindrical barrel 37 and the glass flat 38 to fall away from the stationary glass flat 34 and the film F therebetween. Accordingly, the glass flats 34 and 38 are automatically separated so that the film may be moved therebetween.

As the fork member 97 is moved to open or separate the glass flats 34 and 38 by the movement or rocking of the cradle 68, the vertical extending portions 120 which are in contact with the extensions 112 cause the lever 105 to be rotated about its spindle 106 against the action of the spring 117, thereby lowering the objective member 21 to the position shown in Fig. 6. As long as the film is being wound, the tension remains on the chain 58 to hold the fork member 97, the lever 105, and the objective member 21 in the positions shown in Fig. 6. When the proper film frame has been brought into position, the winding means elements are brought to a stop, the tension on the chain 58 is released, the springs 101 return the fork member 97, and hence the glass flat 38, to the film-engaging position, and the spring 117 returns the objective member 21 to its first position. It will be noted from Figs. 2 and 6 that the film strip F assumes different positions with respect to the glass flat 34 when it is stationary and when it is moving or being wound onto one of the reels. By displacing the objective member 21 in the manner described, the image of the film strip on the screen is always in focus, whether the film strip is stationary or in motion. The objective member 21, therefore, assumes two positions, the first position when the film strip is stationary, and a second position when the film is in motion or being wound onto one of the reels.

The objective member 21 is maintained in the first position by the coil spring 117 which holds the lever 105 against the cap 116 of the focusing knob 115. The image of the film strip F on the screen 19 can be focused when the objective member 21 is in its first position by turning the knob 115 which pivots the lever 105 about the spindle 106 and raises or lowers the objective member 21 against the action of the coil spring 117. In the second position, the objective member is focused by adjusting the screw 121 when the objective member is in its second position, the screw 121 being threaded into the lever 105 and being locked in the adjusted position by the nut 122. The screw 121, by abutting the plate 20 when the lever 105 is actuated by the fork member 97, locates the objective member 21 in its proper position with respect to the plane of the film. With this arrangement for each position of the objective member 21, the image is certain of being in focus.

Other advantages of the film-handling apparatus disclosed herein will be obvious to those skilled in the art, and modifications of the various elements disclosed to obtain the same advantages will also be apparent. Therefore, the present disclosure is to be construed only in an illustrative sense, and the scope of the invention is defined in the claims which follow.

Having thus described my invention, what I claim is:

1. In a film-handling apparatus, the combination with a film-supporting means including two separable film-engaging members for engaging and positioning a film strip in a plane determined by one of said film-engaging members, a film-advancing means for moving said film strip in a plane parallel to and displaced from said first-mentioned plane and between said separated film-engaging members, and an objective member having a focal plane and an optical axis and for projecting an image of said film strip, of an objective mounting means for supporting said objective member in a position in which the focal plane thereof coincides with said first-mentioned film plane and for movement along said axis to a second position in which the focal plane thereof coincides with said second-mentioned film plane, and an operating means responsive to said film-advancing means for simultaneously actuating said film-engaging members and moving said objective mounting means so that the focal plane of said objective member moves from said first-mentioned film plane into coincidence with the displaced plane of said film strip.

2. In a film-handling apparatus, the combination with a film-supporting means including two separable film-engaging members for engaging and positioning a film strip in a plane determined by one of said film-engaging members, a film-advancing means for moving said film strip in a plane parallel to and displaced from said first-mentioned plane and between said separated film-engaging members, and an objective member having a focal plane and an optical axis and for projecting an image of said film strip, of an objective mounting means for supporting said objective member in a position in which the focal plane thereof coincides with said first-mentioned film plane and for movement along said axis to a second position in which the focal plane thereof coincides with said second-mentioned film plane, an operating means responsive to said film-advancing means for simultaneously actuating said film-engaging members and moving said objective mounting means from said first position to said second position so that the focal plane of said objective member remains in coincidence with the plane of said film strip, and means for focusing said objective member in either of said positions.

3. In a film-handling apparatus, the combination with a casing including a wall, a screen on said casing, a head on said wall including two separable film-engaging members for engaging and positioning a film strip in a predetermined plane, a film-advancing means for moving said film strip in a plane displaced from said first-mentioned plane, an endless drive member on said casing and operatively connected to said film-advancing means, a winding member on said casing for moving said endless drive member, and an objective member having a focal plane and an optical axis and for projecting an image of said film strip onto said screen, of an objective mounting means for supporting said objective member with said focal plane in said predetermined plane and for movement along said axis, and an operating means operatively connected to said film advancing means and said objective mounting means and including a rockable cradle adapted to be rocked by the movement of said endless drive member for simultaneously actuating said film-engaging members and moving said objective mounting means along said axis upon movement of said film strip so that the focal plane of said objective member coincides with the plane of said film strip.

4. In a film-handling apparatus, the combination with a casing including a wall, a screen on said casing, a head on said wall including two separable film-engaging members for engaging and positioning a film strip in a predetermined plane, a film advancing means on said head including spindles and driven members connected thereto for moving said film strip in a plane parallel to and displaced from said first-mentioned plane, an endless drive member on said casing and operatively connected to said driven members, a winding member on said casing for moving said endless drive member, and an objective member having a focal plane and an optical axis and for projecting an image of said film strip onto said screen, of an objective mounting means for supporting said objective member with said focal plane in said predetermined plane and for movement along said axis, an operating means operatively connected to said film advancing means and said objective mounting means and actuated by the movement of said endless drive member for simultaneously actuating said film-engaging members and moving said objective mounting means along said axis so that the focal plane of said objective member coincides with the plane of said film strip, and a focusing means mounted on said wall and operatively connected with said operating means for focusing said objective member in either position.

5. In a film-handling apparatus, the combination with a casing including a wall, a screen on said casing, a rotatable head on said wall for supporting a film strip thereon and including two separable film-engaging members for engaging and positioning said film strip in a plane determined by one of said film-engaging members, a film-advancing means on said head including spindles and driven members connected thereto for moving said film strip in a plane displaced from said first-mentioned plane, and an objective member having a focal plane and an optical axis and for projecting an image of said film strip onto said screen, of an objective mounting means for supporting said objective member in a position in which the focal plane thereof coincides with said first-mentioned film plane and for movement along said axis to a second position in which the focal plane thereof coincides with said second-mentioned film plane, and an operating means operatively connected to said film advancing means and said objective mounting means and responsive to said film-advancing means for simultaneously actuating said film-engaging members and moving said objective mounting means to said second position so that the focal plane of said objective member coincides with the plane of said film strip.

6. In a film-handling apparatus, the combination with a casing including a wall, a screen on said casing, a rotatable head on said wall for supporting a film strip thereon and including two separable film-engaging members for engaging and positioning said film strip in a plane determined by one of said film-engaging members, a film-advancing means on said head including spindles and driven members connected thereto for moving said film strip in a plane displaced from said first-mentioned plane, and an objective member having a focal plane and an optical axis and for projecting an image of said film strip onto said screen, of an objective mounting means for supporting said objective member in a position in which the focal plane thereof coincides with said first-mentioned film plane and for movement along said axis to a second position in which the focal plane thereof coincides with said second-mentioned film plane, an operating means operatively connected to said film advancing means and said objective mounting means and responsive to said film-advancing means for simultaneously actuating said film-engaging members and moving said objective mounting means along said axis so that the focal plane of said objective member is maintained in the plane of said film strip during movement thereof, and a focusing means mounted on said wall and operatively connected with said operating means for focusing said objective member in either position.

7. In a film-handling apparatus, the combination with a casing including a wall, a mirror mounted in said casing, a screen for receiving an image directed thereto by said mirror, a rotatable head on said wall for supporting a film strip thereon and including a gate member comprising two separable film-engaging members for engaging and positioning said film strip in a predetermined plane, a film-advancing means on said head including spindles and driven members connected thereto for moving said film strip in a plane displaced from said first-mentioned plane, an endless drive member on said casing and operatively connected to said driven members, a winding member on said casing for moving said endless drive member, and an objective member having a focal plane and an optical axis and for projecting an image of said film strip onto said screen, of an objective mounting means for supporting said objective member for movement along said axis from a position in which the focal plane thereof coincides with said first-mentioned plane to a position in which the focal plane thereof coincides with said second-mentioned plane, and a film gate actuating means including a rockable cradle adapted to be rocked by the movement of said endless drive member and means operatively connected to said film-gate actuating means and to said objective mounting means for simultaneously actuating said gate member and moving said objective mounting means so that the focal plane of said objective member coincides with the plane of said film strip.

8. In a film-handling apparatus, the combination with a casing including a wall, a mirror in said casing, a screen on said casing for receiving an image directed thereto by said mirror, a rotatable head on said wall for supporting a film strip thereon and including a stationary gate member and a movable gate member for engaging and positioning said film strip in a plane determined by said stationary gate member, a film-advancing means on said head including spindles and driven members connected thereto for moving said film strip in a plane parallel to and displaced from said first-mentioned plane, an endless drive member on said casing and operatively connected to said driven members, a winding means on said casing for moving said endless drive member, and an objective member having a focal plane and an optical axis and for projecting an image of said film strip onto said screen, of an objective mounting means for supporting said objective member for movement along said axis from a position in which the focal plane thereof coincides with said first-mentioned plane to a second position in which the focal plane thereof coincides with said second-mentioned plane, a gate-actuating means including a rockable cradle adapted to be rocked by the movement of said endless drive member and means operatively connected to said film-gate actuating means and to said objective mounting means for simultaneously actuating said movable gate member and moving said objective mounting means so that the focal plane of said objective member coincides with the plane of said film strip.

9. In a film-handling apparatus, the combination with a casing including a wall, a mirror in said casing, a screen on said casing for receiving an image directed thereto by said mirror, a rotatable head on said wall for supporting a film strip thereon and including a stationary gate member and a movable gate member for engaging and positioning said film strip in a plane determined by said stationary gate member, a film-advancing means on said head including spindles and driven members connected thereto for moving said film strip in a plane parallel to and displaced from said first-mentioned plane, an endless drive member on said casing and operatively connected to said driven members, a winding means on said casing for moving said endless drive member, and an objective member having a focal plane and an optical axis and for projecting an image of said film strip onto said screen, of an objective mounting means for supporting said objective member for movement along said axis from a position in which the focal plane thereof coincides with said first-mentioned plane to a second position in which the focal plane thereof coincides with said second-mentioned plane, a gate-actuating means including a rockable cradle adapted to be rocked by the movement of said endless drive member and means operatively connected to said film-gate actuating means and to said objective mounting means for simultaneously actuating said movable gate member and moving said objective mounting means so that the focal plane of said objective member coincides with the plane of said film strip, and means associated with said gate-actuating means for focusing said objective member.

10. In a film-handling apparatus, the combination with a casing including a wall, a mirror in said casing, a screen on said casing for receiving an image directed thereto by said mirror, a rotatable head on said wall for supporting a film strip thereon and including a stationary gate member and a movable gate member for engaging and positioning said film strip in a plane determined by said stationary gate member, a film-advancing means on said head including spindles and driven members connected thereto for moving said film strip in a plane parallel to and displaced from said first-mentioned plane and between said separated stationary and movable gate members, an endless drive member on said casing and operatively connected to said driven members, a winding means on said casing for moving said endless drive member, and an objective member having a focal plane and an optical axis and for projecting an image of said film strip onto said screen, of an objective mounting means for supporting said objective member for movement along said axis from a position in which the focal plane thereof coincides with said first-mentioned plane to a second position in which the focal plane thereof coincides with said second-mentioned plane, a support means pivotally mounted on said wall for supporting said objective mounting means, a gate-actuating means including a rockable cradle adapted to be rocked by the movement of said endless drive member and an actuating member adapted to engage said support means for simultaneously actuating said movable gate member and said objective mounting means so that the focal plane of said objective member coincides with the plane of said film strip.

11. In a film-handling apparatus, the combination with a casing including a wall, a mirror in said casing, a screen on said casing for receiving an image directed thereto by said mirror, a rotatable head on said wall for supporting a film strip thereon and including a stationary gate member and a movable gate member for engaging and positioning said film strip in a plane determined by said stationary gate member, a film-advancing means on said head including spindles and driven members connected thereto for moving said film strip in a plane parallel to and displaced from said first-mentioned plane and between said separated stationary and movable gate members, an endless drive member on said casing and operatively connected to said driven members, a winding means on said casing for moving said endless drive member, and an objective member having a focal plane and an optical axis and for projecting an image of said film strip onto said screen, of an objective mounting means for supporting said objective member for movement along said axis from a position in which the focal plane thereof coincides with said first-mentioned plane to a second position in which the focal plane thereof coincides with said second-mentioned plane, a support means pivotally mounted on said wall for supporting said objective mounting means, a gate actuating means including a rockable cradle adapted to be rocked by the movement of said endless drive member and an actuating member adapted to engage said support means for actuating said movable gate member simultaneously with the actuation of said objective mounting means so that the focal plane of said objective member coincides with the plane of said film strip, a focusing means mounted on said wall and associated with said support means for focusing said objective member in said first position, and a second focusing means on said support for focusing said objective in said second position.

ROY S. HOPKINS.

REFERENCES CITED

The following references are of record in the file of this patent:

UNITED STATES PATENTS

| Number | Name | Date |
|---|---|---|
| 1,889,575 | Sebille | Nov. 29, 1932 |
| 2,110,484 | Hopkins | Mar. 8, 1938 |
| 2,279,463 | Hopkins | Apr. 14, 1942 |
| 2,304,921 | Hopkins | Dec. 15, 1942 |
| 2,346,074 | Hopkins | Apr. 4, 1944 |
| 2,377,476 | Berglund | June 5, 1945 |